(12) United States Patent
Kernwein et al.

(10) Patent No.: US 9,469,310 B2
(45) Date of Patent: Oct. 18, 2016

(54) SYSTEM, APPARATUS, AND METHOD FOR AUTOMATICALLY CONTROLLING A LOCOMOTIVE

(71) Applicant: Wabtec Holding Corp., Wilmerding, PA (US)

(72) Inventors: Jeffrey D. Kernwein, Cedar Rapids, IA (US); Donald J. Gillen, Walford, IA (US); Richard S. Klemanski, Walkersville, MD (US); Shawn D. Rouse, Marion, IA (US); Scott A. Sollars, Marion, IA (US)

(73) Assignee: Wabtec Holding Corp., Wilmerding, PA (US)

( * ) Notice: Subject to any disclaimer, the term of this patent is extended or adjusted under 35 U.S.C. 154(b) by 125 days.

(21) Appl. No.: 13/654,974

(22) Filed: Oct. 18, 2012

(65) Prior Publication Data

US 2014/0114507 A1    Apr. 24, 2014

(51) Int. Cl.
| | |
|---|---|
| *B60L 7/26* | (2006.01) |
| *B61C 17/12* | (2006.01) |
| *B61L 3/00* | (2006.01) |
| *B60L 1/00* | (2006.01) |
| *B60L 3/00* | (2006.01) |
| *B60L 3/04* | (2006.01) |
| *B60L 9/04* | (2006.01) |
| *B60L 9/12* | (2006.01) |
| *B60L 9/22* | (2006.01) |
| *B60L 9/28* | (2006.01) |

(52) U.S. Cl.
CPC ............. *B61C 17/12* (2013.01); *B60L 1/003* (2013.01); *B60L 3/0069* (2013.01); *B60L 3/04* (2013.01); *B60L 7/26* (2013.01); *B60L 9/04* (2013.01); *B60L 9/12* (2013.01); *B60L 9/22* (2013.01); *B60L 9/28* (2013.01); *B61L 3/008* (2013.01); *B60L 2200/26* (2013.01); *B60L 2240/12* (2013.01); *B60L 2250/10* (2013.01); *B60L 2250/16* (2013.01); *B60L 2250/24* (2013.01); *Y02T 30/10* (2013.01); *Y02T 90/16* (2013.01)

(58) Field of Classification Search
CPC .... B60T 7/12; B61L 27/0011; B61L 25/021; B61L 3/008; G06F 7/00; B60L 3/0069; B60L 7/26
USPC ....... 701/2, 19, 20, 93; 340/933; 246/167 R, 246/182 B, 182 C, 186
See application file for complete search history.

(56) References Cited

U.S. PATENT DOCUMENTS 4,181,943 A * 1/1980 Mercer et al. ................. 701/20
4,234,922 A   11/1980 Wilde et al.

(Continued)

FOREIGN PATENT DOCUMENTS

| | | |
|---|---|---|
| JP | 966832 A | 3/1997 |
| KR | 100198147 B1 | 6/1999 |

*Primary Examiner* — Adam Tissot
*Assistant Examiner* — Aaron Smith
(74) *Attorney, Agent, or Firm* — The Webb Law Firm

(57) ABSTRACT

A system, method, and apparatus for automatically controlling a locomotive include a control interface unit configured to receive input from at least one manual control, receive input from an automatic control system, and transmit commands to a locomotive control system, wherein the commands are based at least partially on the input received from the automatic control system. A bypass relay may also be provided to enable and disable communication between the at least one manual control and the locomotive control system.

27 Claims, 5 Drawing Sheets

(56) References Cited

U.S. PATENT DOCUMENTS

| | | | | |
|---|---|---|---|---|
| 4,360,873 | A | 11/1982 | Wilde et al. | |
| 5,172,316 | A | 12/1992 | Root et al. | |
| 5,249,125 | A | 9/1993 | Root et al. | |
| 5,412,572 | A | 5/1995 | Root et al. | |
| 5,500,799 | A | 3/1996 | Balukin et al. | |
| 5,511,749 | A | 4/1996 | Horst et al. | |
| 5,564,657 | A | 10/1996 | Dimsa et al. | |
| 5,570,284 | A | 10/1996 | Roselli et al. | |
| 5,771,481 | A * | 6/1998 | Gilling | 701/93 |
| 5,778,331 | A * | 7/1998 | Leising et al. | 701/66 |
| 5,787,371 | A | 7/1998 | Balukin et al. | |
| 5,907,976 | A | 6/1999 | Santoro, Jr. et al. | |
| 5,950,967 | A | 9/1999 | Montgomery | |
| 6,718,255 | B1 | 4/2004 | Okubo | |
| 6,922,619 | B2 | 7/2005 | Baig et al. | |
| 6,937,925 | B2 | 8/2005 | Smith | |
| 6,980,127 | B2 * | 12/2005 | Lumbis et al. | 340/933 |
| 7,021,589 | B2 | 4/2006 | Hess, Jr. et al. | |
| RE39,758 | E | 8/2007 | Horst et al. | |
| 7,359,770 | B2 | 4/2008 | Cole | |
| 7,447,571 | B2 | 11/2008 | Nickles et al. | |
| 7,680,566 | B2 | 3/2010 | Liberatore | |
| 7,941,252 | B2 | 5/2011 | Medema et al. | |
| 7,983,828 | B2 * | 7/2011 | Ezoe et al. | 701/78 |
| 8,095,253 | B2 | 1/2012 | Kane et al. | |
| 8,229,607 | B2 * | 7/2012 | Hrdlicka et al. | 701/20 |
| 8,398,405 | B2 * | 3/2013 | Kumar | B61C 17/12 434/65 |
| 8,428,796 | B2 * | 4/2013 | Donnelly | 701/19 |
| 8,532,842 | B2 * | 9/2013 | Smith et al. | 701/2 |
| 2004/0064223 | A1 | 4/2004 | Horst et al. | |
| 2007/0225878 | A1 | 9/2007 | Kumar et al. | |
| 2008/0033605 | A1 | 2/2008 | Daum et al. | |
| 2008/0082223 | A1 | 4/2008 | Daum et al. | |
| 2008/0167767 | A1 | 7/2008 | Brooks et al. | |
| 2008/0201019 | A1 | 8/2008 | Kumar et al. | |
| 2010/0049384 | A1 | 2/2010 | Kraeling et al. | |
| 2010/0262321 | A1 | 10/2010 | Daum et al. | |
| 2010/0280683 | A1 | 11/2010 | Miyauchi | |
| 2010/0318247 | A1 | 12/2010 | Kumar | |
| 2011/0118914 | A1 | 5/2011 | Brooks et al. | |
| 2012/0109423 | A1 | 5/2012 | Pack et al. | |
| 2012/0126065 | A1 | 5/2012 | Smith et al. | |
| 2013/0325258 | A1 * | 12/2013 | Cooper | B60T 7/18 701/36 |

* cited by examiner

SYSTEM, APPARATUS, AND METHOD FOR AUTOMATICALLY CONTROLLING A LOCOMOTIVE

BACKGROUND OF THE INVENTION

1. Field of the Invention

This invention relates generally to an interface for a manual controller and a locomotive and, more specifically, to a system, apparatus, and method for controlling a locomotive with an automatic control system.

2. Background of the Invention

Railroads are beginning to pursue locomotive "cruise control" systems for operating locomotives. These systems will require a crew member to engage or disengage the system and will also require a computer to drive the throttle, dynamic brake, and air brake systems. These systems may be implemented in, for example, a lead locomotive of a train or a pusher locomotive. In these existing systems, a crew member would normally be present with a computer-controlled system that would have a need to control the throttle and brake of the locomotive.

This implementation poses a problem in that, when a computer controls the throttle and brake systems and an operator is allowed to disengage the computer-controlled system, the control settings of the manual controls may not match the computer-controlled system settings when it is disengaged. This mismatch of control settings can cause a number of problems, including an undesired jump up or down in a throttle notch, resulting in an undesired acceleration or braking action. An undesired jump up of a throttle notch may result in increased speed or high in-train forces. An undesired jump down in a throttle notch may be problematic if the train is climbing a steep grade, since a sudden loss of power could stall the train on the grade.

Further, if the dynamic brake or independent brake settings do not match the computer-controlled system settings, there may be a reduction in braking force that causes an undesired increase in speed. Since neither the dynamic brake nor independent brake have detents in the handle position, it is difficult to indicate to the crew where to place the handle when disengaging. If the brake handle setting does not match the computer-controlled automatic brake setting, there may be an undesired release of the train air brakes. If an undesired release occurs, the train could increase in speed and a second pneumatic brake set would have to occur to reapply the brakes. This could be an undesirable situation because it reduces the brake pipe to a low level and could reach the point of not being able to command further reductions.

For at least the foregoing reasons, there is a need for a system, apparatus, and method that can control the throttle, dynamic brake, air brake, distributed power system, and/or other manual controls normally operated by a crew member.

SUMMARY OF THE INVENTION

Generally, the present invention provides systems, apparatus, and methods for automatically controlling a locomotive that address or overcome certain drawbacks and deficiencies existing in known automatic control systems. Preferably, the present invention provides systems, apparatus, and methods for automatically controlling a locomotive by interfacing with a manual control, a locomotive control system, and an automatic control system.

According to one preferred and non-limiting embodiment of the present invention, provided is a manual control interface for automatically controlling a locomotive, which includes a control interface unit to receive input from at least one manual control, receive input from an automatic control system, and transmit commands to a locomotive control system, wherein the commands are based at least partially on the input received from the automatic control system; and a bypass relay to enable and disable communication between the at least one manual control and the locomotive control system.

According to another preferred and non-limiting embodiment of the present invention, provided is a method for automatically controlling a locomotive, including: receiving automatic control data from an automatic control system; disabling control communication between at least one manual control and a locomotive control system; detecting a state of the at least one manual control; transmitting the state of the at least one manual control to the automatic control system; and transmitting, to the locomotive control system, control data based at least partially on the automatic control data.

According to a further preferred and non-limiting embodiment of the present invention, provided is a control interface unit for automatically controlling a locomotive, which control interface unit is adapted to communicate with a throttle handle, a cruise control system, and a locomotive computer, where the control interface unit includes at least one processor, and wherein the control interface unit is programmed, configured, or adapted to: disable communication between the throttle handle and the locomotive computer; receive cruise control commands from the cruise control system; and control the locomotive computer based at least partially on the cruise control commands.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a", "an", and "the" include plural referents unless the context clearly dictates otherwise.

DESCRIPTION OF THE PREFERRED EMBODIMENTS

Figure 1:
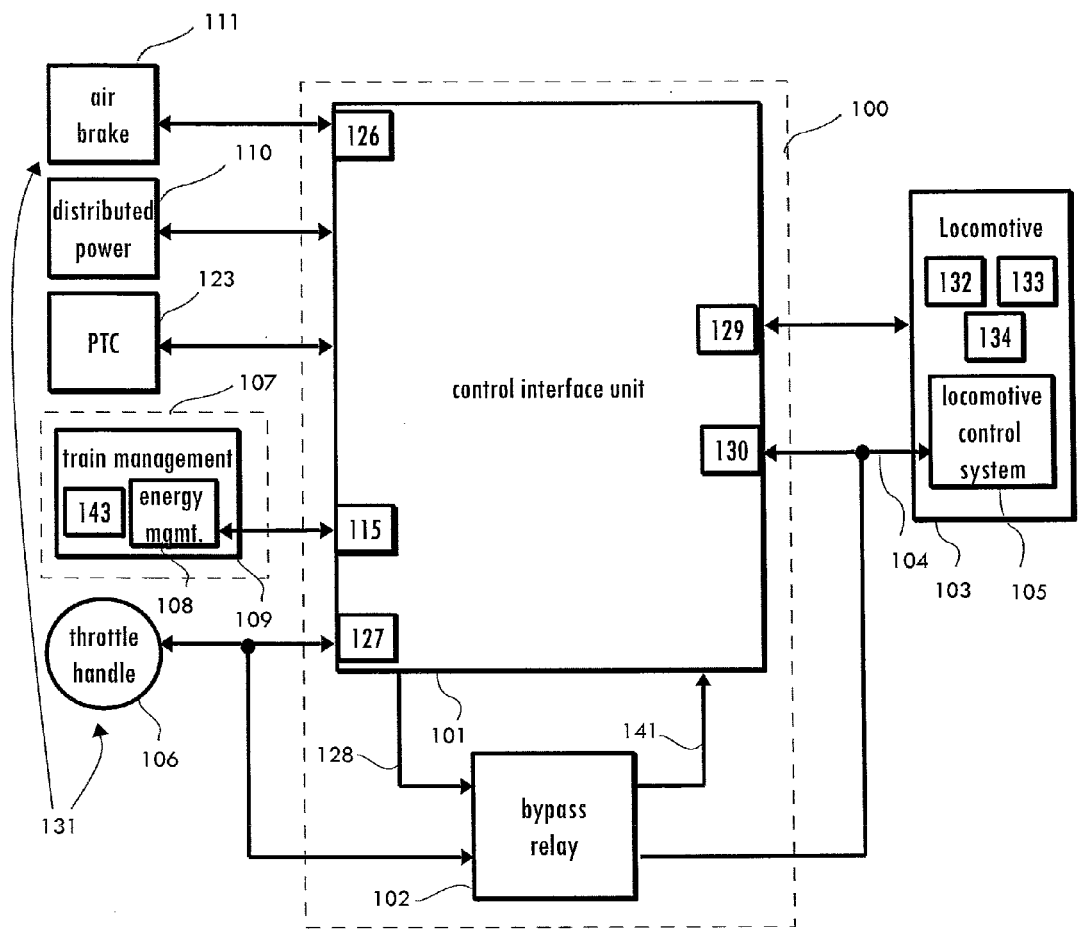
FIG. 1 is a schematic view of one embodiment of a manual control interface system and method according to the principles of the present invention.

For purposes of the description hereinafter, the terms "end", "upper", "lower", "right", "left", "vertical", "horizontal", "top", "bottom", "lateral", "longitudinal" and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments of the invention. Hence, specific dimensions and other physical characteristics related to the embodiments disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, routed, and the like, between the first and second unit or component. For example, a first unit may be in communication with a second unit even though the first unit passively receives data, and does not actively transmit data to the second unit. As another example, a first unit may be in communication with a second unit if an intermediary unit processes data from one unit and transmits processed data to the second unit. It will be appreciated that numerous other arrangements are possible.

As used herein, the terms "manual control" or "manual controls" refer to one or more controls normally operated by a crew member or other operator. This may include, for example, a throttle and/or dynamic brake handle, an electric air brake actuator and/or controller, a locomotive display, a computer input device, a horn actuator/button, a crossing-signal on/off or selection switch, or any other type of control that is capable of manual operation by a crew member. In a preferred and non-limiting embodiment, the manual control includes a throttle handle used to control the throttle and a dynamic brake arrangement. However, it will be appreciated that any number of manual controls may be used with the manual control interface system.

Referring now to FIG. 1, a manual control interface system 100 is shown according to one preferred and non-limiting embodiment. The manual control interface system 100 includes a control interface unit 101 and a bypass relay 102. The control interface unit 101 interfaces and communicates with a manual control, such as a throttle handle 106 and/or an electric air brake actuator and/or controller 111, an automatic control system 107, a positive train control (PTC) system 123, and a distributed power system 110. The control interface unit 101 also interfaces with a locomotive control system 105 (e.g., locomotive computer) via a trainline 104. In this embodiment, the bypass relay 102 is positioned between the throttle handle 106 and the locomotive control system 105, and is in communication with the control interface unit 101. The bypass relay 102 may also be positioned between the electric air brake controller 111, or any other manual control, and the locomotive control system 105. It will be appreciated that the PTC system 123 may include a variety of train management systems and components, such as a train management computer 109. Further, the locomotive control system 105 receives input from the trainline 104 and controls propulsion of the locomotive 103.

According to one preferred and non-limiting embodiment of the present invention, and with continued reference to FIG. 1, the manual control interface system 100 is configured to issue commands to the locomotive control system 105 as though one or more manual controls, such as the throttle handle 106, are being operated. In this example, the manual control interface system 100 first receives commands from an automatic control system 107 before transmitting control commands to the locomotive control system 105 by means of the trainline 104 in order to emulate commands issued from ordinary, manual controls 131. Thus, a computer-controlled automatic control system 107 may control braking, acceleration, and other locomotive functions as though a human operator were manipulating manual controls 131 within the locomotive cab. Since the manual control interface system 100 communicates with ordinary manual controls 131 and locomotive control systems 105, it can be used to retrofit locomotives, regardless of make or model, with integrated automatic control systems without causing any conflicts or mismatches between the automatic control settings and actual manual control settings.

Still referring to FIG. 1, the automatic control system 107 may include one or more hardware and/or software modules that issue control commands or other signals. In one preferred and non-limiting embodiment, the automatic control system 107 includes or is in the form of the train management computer 109 and/or an energy management system 108 installed on the train management computer 109. The energy management system 108 may be a software application executed by the train management computer 109, but may take on other forms, including an independent device, or software executed on any other computing device in communication with the manual control interface system 100. The train management computer 109 may include a display device 143 and, as explained above, may be part of the PTC system 123.

The energy management system 108 may implement cruise control features and issue control commands. The train management computer 109 may issue other types of control commands such as, for example, remotely controlled commands and/or preprogrammed commands. In one preferred and non-limiting embodiment, the automatic control system 107, when engaged, controls the throttle and dynamic brake of the locomotive 103. The automatic control system 107, including the train management computer 109, may interface with the control interface unit 101 with, for example, an Ethernet connection (e.g., M12, RJ45, and the like) through the train management computer 109.

With continued reference to FIG. 1, the bypass relay 102 may be part of or separate from the control interface unit 101 and allows for or facilitates a manual control 131, such as the throttle handle 106, to be disabled (e.g., the control interface unit 101 is cut-in), interrupting communication between the throttle handle 106 and the locomotive control system 105. The bypass relay 102 also allows for a manual control 131 to be enabled (e.g., the control interface unit 101 is cut-out), restoring communication between the manual control 131 and the locomotive control system 105.

In one preferred and non-limiting embodiment, the bypass relay 102 may be a mechanical, electro-mechanical, and/or solid state relay, or any other type of switching or interrupting device that allows or facilitates communication between the manual control 131 and locomotive control system 105 to be enabled and/or disabled. The bypass relay 102 may be in communication with the throttle handle 106 and the locomotive control system 105, including the trainline 104, as well as the control interface unit 101. In this way, the control interface unit 101 can control the bypass relay 102 by enabling or disabling communication between the throttle handle 106, electronic air brake controller 111, and/or other manual control 131, and the locomotive control system 105, while the control interface unit 101 simultaneously monitors the position (or state) of the throttle handle 106 or other manual control component.

In one preferred and non-limiting embodiment, the control interface unit 101 may include a variety of input and output ports and/or interfaces. For example, and with continued reference to FIG. 1, the control interface unit 101 may include a serial interface 126 (e.g., an asynchronous interface able to communicate RS422 standardized signals, or any other serial interface), a 10/100 Ethernet interface 115 (e.g., physical layer interface microchip), a wheel tachometer interface, and/or an interface 127 for the throttle handle 106 and/or brake handle. However, it will be appreciated that any wired and/or wireless connection can be used by the manual control interface system 100 to communicate with manual controls 131, the automatic control system 107, the locomotive control system 105, trainline 104, and/or other systems and components. The serial interface 126 may be used to interface with an electronic air brake controller 111, allowing communication between the automatic control system 107 and the electronic air brake controller 111 using the manual control interface unit 101. Existing serial links between the electronic air brake controller 111 and the locomotive 103 may be utilized, allowing for the automatic control system 107 to actuate the electromagnetic valves that control the electronic air brake 111.

As an example, and with continued reference to FIG. 1, the interface 127 for the throttle handle 106 and/or brake handle may include a number of 74 volt DC discrete inputs and/or analog inputs. An interface 130 for the trainline 104 may include a number of 74 volt DC discrete inputs, discrete outputs, and/or analog inputs, and the interface 129 for other portions of the locomotive (e.g., horn 132, crossing bell 133, headlights 134, and the like) may include a number of 74 volt DC discrete and/or analog inputs and/or outputs. For the locomotive 103, the outputs may drive headlights 134, a crossing bell 133, a locomotive horn 132, and/or other similar operating devices or components. The control interface unit 101 may interface with the bypass relay 102 using a number of 74 volt DC discrete inputs and/or outputs. At least one output 128 may be used to drive the bypass relay 102, in order to disable the manual control from communicating with the locomotive control system 105, and at least one input 141 may be used to detect a state of the bypass relay 102.

Still referring to FIG. 1, the bypass relay 102 allows for the manual controls 131, e.g., throttle handle 106, electric air brake controller 111, and the like, to be disabled, disconnected, and/or otherwise removed from communication with the locomotive control computer 105 and/or trainline 104, allowing the control interface unit 101 to determine movement of the throttle handle 106, or other manual controls 131, without causing interference or contention on the trainline 104 between the manual control settings and the automatic control system 107 settings. For example, by transmitting the position of the throttle handle 106 to the automatic control system 107, the automatic control system 107 is able to smoothly and/or gradually exit from an automatic control operation without any undesired jumps in acceleration or braking.

In one preferred and non-limiting embodiment, and with continued reference to FIG. 1, the state of the manual controls, such as a throttle handle 106, is used to gradually exit from an automatic control mode and transition to manual control mode without any undesired jump or transition in brake or acceleration arising from an inconsistency between the position (or state) of the throttle handle 106, or other manual control 131, and the setting of the automatic control system 107. As an example, the automatic control system 107 may not allow disengagement of the automatic control system 107 unless the throttle handle 106 is in a particular position. A display device 143 of the automatic control system 107, such as one in communication with the train management computer 109, may indicate a particular position (e.g., fourth notch) for the operator to place the throttle handle 106 in. In this way, the throttle handle 106 setting matches the automatic control setting 107 and the transition between control modes is substantially seamless.

In one preferred and non-limiting embodiment, and with continued reference to FIG. 1, the manual control interface system 100 may disengage the automatic control system 107, or cause the automatic control system 107 to be otherwise disengaged, when the throttle handle 106 or other manual control 131 is placed in a particular position (or is in a particular state), such as the then-current setting of the automatic control system 107. In this way, if the automatic control system 107 and/or train management computer 109 experiences an error, the crew member can disengage the automatic control system 107 by manually moving the throttle handle 106 to match the setting of the automatic control system 107. The manual control interface system 100 may also be configured to disengage the automatic control system 107 and revert to a manual control mode when the throttle handle 106 is moved, such as to a higher and/or lower notch.

Figure 2:
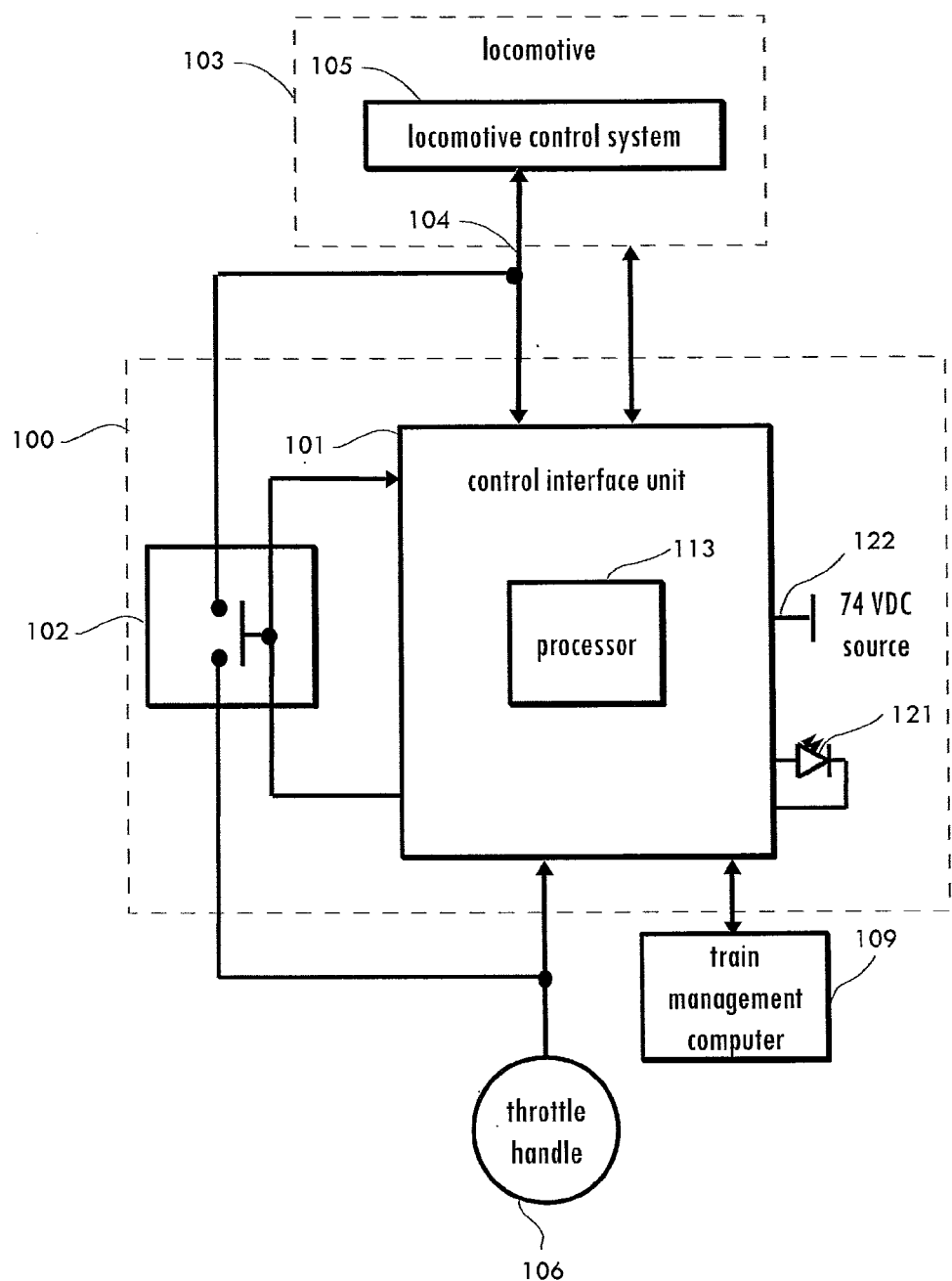
FIG. 2 is a schematic view of another embodiment of a manual control interface system and method according to the principles of the present invention.

Referring now to FIG. 2, a manual control interface system 100 is shown according to another preferred and non-limiting embodiment. The manual control interface system 100 includes a bypass relay 102 and a control interface unit 101. The control interface unit 101 includes a processor 113, and is configured to drive (e.g., change the state of or actuate) the bypass relay 102. The control interface unit 101 includes a 74 volt DC power source 122 and a fault indicator 121, such as a light-emitting diode (LED). The control interface unit 101 and bypass relay 102 are configured to communicate with the throttle handle 106, or other type of manual control, and the locomotive control system 105 via the trainline 104. The control interface unit 101 may be further configured to interface with other components of the locomotive 103, such as the horn 132, headlights 134, and crossing bell 133 (shown in FIG. 1), and the train management computer 109, which may include an energy management system 108.

Figure 3:
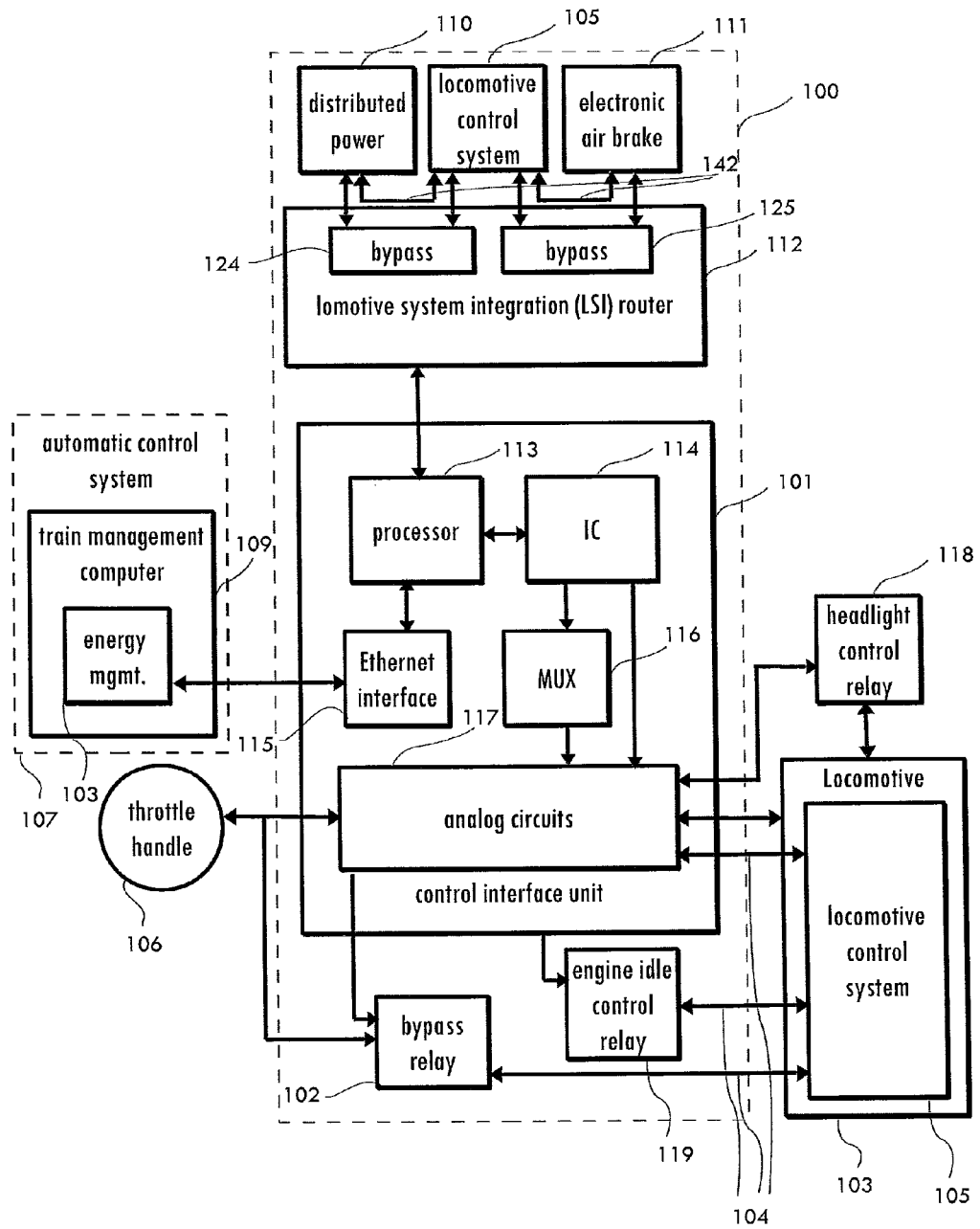
FIG. 3 is a schematic view of a further embodiment of a manual control interface system and method according to the principles of the present invention.

Referring to FIG. 3, a further preferred and non-limiting embodiment of a manual control interface system 100 is shown. The system 100 includes a control interface unit 101, a bypass relay 102, an engine idle control relay 119, and a locomotive system integration (LSI) router 112. The control interface unit 101 includes at least one processor 113, an integrated circuit 114, such as a field programmable gate array (FPGA), a multiplexor 116, and one or more analog circuits 117. The throttle handle 106 and trainline 104 interface with the analog circuits 117 of the control interface unit 101. The automatic control system 107, including a train management computer 109 and/or energy management system 108, interfaces with the control unit 101 through an Ethernet interface, such as a physical layer microchip 115 that operates at the physical layer of the Open Systems Interconnection (OSI) network model. The physical layer microchip 115 may use a standard Ethernet connection to facilitate communication between the energy management system 103 and the control interface unit 101. The multiplexor 116 may be used to control (e.g., select) analog and serial paths between the integrated circuit 114 and the analog circuits 117. The engine idle control relay 119 allows the energy management system 108 to command the control interface unit 101 to transition the locomotive engine to an auto control start position or state (e.g., an IDLE position or state) to save fuel, for example, if it is determined that the engine does not need the current level of horsepower.

In one preferred and non-limiting embodiment, and with continued reference to FIG. 3, the analog circuit 117 is in communication with the integrated circuit 114 and the multiplexor 116, and the integrated circuit 114 is in communication with the processor 113 and the multiplexor 116. Command signals received from the automatic control system 107 may be processed and converted to analog by the integrated circuit 114, and then transmitted to the analog circuit 117 to communicate with the locomotive control system 105 via the trainline 104.

In one preferred and non-limiting embodiment, the system 100 can be installed between the locomotive control system 105 and distributed power system 110 and/or electronic air brake system 111. In this embodiment, the system 100 may be configured to relay standardized Locomotive System Integration (LSI) messages, or other types of data, between the systems without altering the message contents or timing. In this way, the messages may be indistinguishable from crew commands. By being inserted into the industry-standard LSI link 142, the system 100 can be generically adaptable to a locomotive regardless of model and/or manufacturer. The system 100, in communication with an LSI link 142 or other like connection, can therefore manage both sides of the connection while additionally sending extra messages and/or other data on one or both sides. By interfacing with the distributed power system 110, the system 100 may effectively communicate to multiple locomotives in a consist. Traditionally, the distributed power system 110 would allow for an engineer in a front locomotive to change settings and remotely control other locomotives in a locomotive or train consist through a display 143 in the cab. The system 100 allows for the control interface unit 101 to control the distributed power system 110 as though the engineer was manually issuing the commands.

In one preferred and non-limiting embodiment, and with continued reference to FIG. 3, the control interface unit 101 maintains independent sequence numbers on each side of the LSI link 142 (i.e., on the automatic control system 107 side and on the distributed power 110 and/or air brake side 111). Thus, the industry-standard LSI messages can be relayed with an appropriate sequence number on each side of the link. By interfacing with the distributed power system 110, the control interface unit 101 is able to communicate with multiple locomotives in a consist. The LSI router 112 may include bypasses 124, 125 to interface with the distributed power system 110, electronic air brake 111, and locomotive control system 105. The bypasses 124, 125 allow for the control interface unit 101 to be bypassed, allowing direct communication between the locomotive control computer 105 and distributed power system 110 and/or electronic air brake 111 without passing through the control interface unit 101.

With reference to FIG. 1, in one preferred and non-limiting embodiment, the manual control interface system 100 is networked with other components of the locomotive 103, and may be assigned an address on a network, or sub-network of a network, on which the PTC system 123 and the energy management system 108 reside. Through this network connection, which may be provided through an Ethernet connection, as an example, the energy management system 108 may communicate with the PTC system 123 for necessary information, and with the manual control interface system 100 to control and monitor various signals. The PTC system 123 may be one or more hardware and/or software modules configured to prevent train separation or collision, enforce speeds, process movement authorities, and the like. The PTC system 123 may include, for example, a controller (e.g., a computer system) for controlling the speed of a locomotive based on track and/or signal conditions. In one example, the PTC system 123 may include the train management computer 109 and display device 143. In one non-limiting embodiment, each locomotive in a train consist or locomotive consist of a train is provided with a router in communication with the sub-network to allow for intra-consist communications.

In addition to transmitting control signals to the trainline 104 and/or locomotive control system 105, the control interface unit 101 may also communicate with other components of the locomotive 103. For example, the control interface unit 101 may communicate one or more of the following signals: engine stop, locomotive on/off, HP boost, crossing bell, alerter acknowledge, engine control, horn, battery voltage, and other inputs and/or outputs. The engine stop signal may allow the control interface unit 101 to detect if any of the engine stop switches on the locomotive 103 have been depressed, and may be monitored but not necessarily controlled by the control interface unit 101. The locomotive on/off signal may be controlled and monitored by the control interface unit 101, and the control interface unit 101 may be configured to provide a control signal to an external engine start/stop device to turn the locomotive 103 on or off.

With continued reference to FIG. 1, the HP boost signal may be controlled and monitored by the control interface unit 101, and the control interface unit 101 may output a control signal to request additional engine output (i.e., a boost in horsepower). The crossing bell signal and horn signal may also be controlled and monitored by the control interface unit 101, such that the control interface unit 101 is able to activate, actuate, and/or otherwise control the crossing bell 133 and horn 132 of the locomotive 103. The alerter acknowledge signal may be monitored and controlled by the control interface unit 101, and used by the unit 101 to indicate that it has control of the throttle handle 106. The control interface unit 101 may also monitor and control an engine control signal, and drive a relay that can put the locomotive 103 into an auto control start position or state (e.g., an IDLE position or state), or any other predetermined or specified state. Additionally, the battery voltage signal (e.g., input voltage to the control interface unit 101) may be monitored by the unit 101. The manual control interface system 100 may also control the long hood and short hood bright headlights 134 through a locomotive command message.

In one preferred and non-limiting embodiment, the engine idle control relay 119 may be configured to disable the throttle signals to drive the locomotive engine to an auto control start position or state (e.g., an IDLE position or state) at the command of the energy management system 108 and/or the automatic control system 107. This action may be performed to save fuel, for example, if it is determined that the engine does not need a current level of horsepower. The headlight control relay 118 may control power to the locomotive headlight 134 to drive the high current output for the headlight circuit.

With reference to FIG. 2, and in one preferred and non-limiting embodiment of the present invention, the manual control interface system 100 includes a fault indicator 121. The fault indicator 121 may include, for example, a light-emitting diode (LED). In one embodiment, the system 100 is configured to cause the fault indicator 121 to glow steadily when the control interface unit 101 is in reset or initializing modes. The system 100 may also cause the fault indicator 121 to blink after an initialization of the control interface unit 101, indicating that the control interface unit 101 is working properly. A failure within the control interface unit 101 may cause the fault indicator 121 to be steadily on or off. It will be appreciated that any number of fault indicators may be used, and that the fault indicators may be in any number of forms including, for example, any device that provides visual and/or auditory indications.

In one preferred and non-limiting embodiment, the control interface unit 101 monitors the throttle handle position and transmits a command response message (e.g., a locomotive command response message) to the automatic control system 107 when the throttle handle 106 changes positions. When the control interface unit 101 receives a command to engage automatic control from the automatic control system 107 and/or train management computer 109, the unit 101 may be configured to disable the throttle handle 106 prior to taking control of the locomotive 103 (e.g., prior to communicating with the locomotive control system 105 and/or trainline 104). Once the unit 101 has taken control of the locomotive 103, the control interface unit 101 may transmit a command response message indicating that it has successfully taken control.

In a further preferred and non-limiting embodiment, the control interface unit 101 may be programmed with a predetermined timeout interval such that, if the control interface unit 101 does not successfully take control of the locomotive within the predetermined timeout interval, it transmits a command response message indicating that it was not successful. In a further preferred and non-limiting embodiment, the control interface unit 101 may be programmed to prevent engagement of the automatic control system 107 if, for example, the throttle handle 106 is in an auto control start position or state (e.g., an IDLE position or state), an engine stop switch has been pressed, and/or a path coordination system (PCS) is active. In one non-limiting embodiment, the train management computer 109 may prompt a crew member, through the display device 143, to move the throttle handle 106 to an auto control start position or state (e.g., an IDLE position or state) after the crew member initiates automatic control and before engaging the automatic control system 107.

Figure 4:
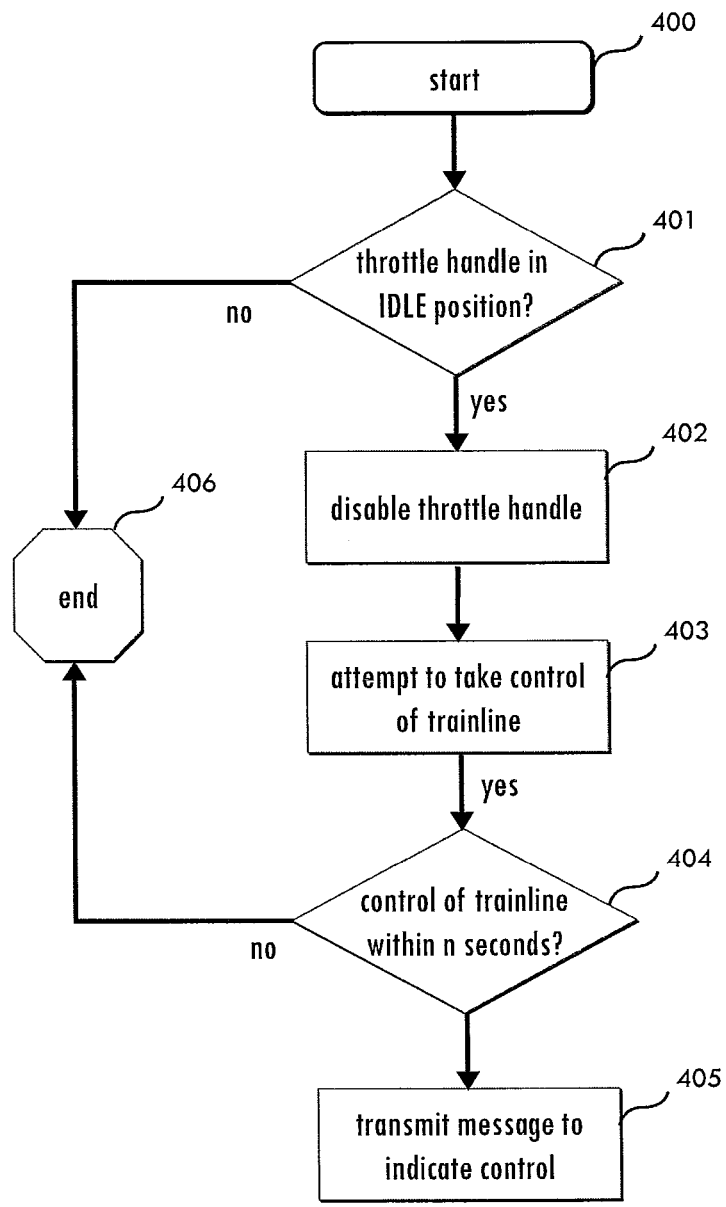
FIG. 4 is a step diagram for one embodiment of a manual control interface system and method according to the principles of the present invention.

Referring now to FIG. 4, a method for engaging an automatic control system 107 with a manual control interface system 100 is shown according to one preferred and non-limiting embodiment. At a starting point 400, the manual control interface system 100 receives a command to engage an automatic control system 107. At a first step 401, a determination is made whether the throttle handle 106 is in an auto control start position or state (e.g., an IDLE position or state). If the throttle handle 106 is in an auto control start position or state (e.g., an IDLE position or state), the method proceeds to step 402 in which the throttle handle 106 is disabled. When disabled, a communication link between the throttle handle 106 and locomotive 103 and/or trainline 104 is interrupted so that the handle no longer directly controls the locomotive 103. If the throttle handle 106 is not in an auto control start position or state (e.g., an IDLE position or state), the method ends at step 406. As described herein, the throttle handle 106 may be disabled with a bypass relay 102, although other methods are possible.

Still referring to FIG. 4, and at a next step 403, after the throttle handle 106 is disabled, the control interface unit 101 attempts to take control of the locomotive 103 and/or trainline 104. At a next step 404, the control interface unit 101 determines if it has control of the locomotive 103 within a predetermined time interval (e.g., n seconds). If the control interface unit 101 does not take control of the locomotive 103 and/or trainline 104 within the predetermined time interval, the method ends at step 406. If the control interface unit 101 does take control within the predetermined time interval, the method proceeds to step 405 in which a message is transmitted to the automatic control system 107 and/or train management computer 109 to indicate that the system 100 has control of the locomotive 103.

In one preferred and non-limiting embodiment of the present invention, the control interface unit 101 may be configured to disengage the automatic control system 107 in response to various conditions. For example, the control interface unit 101 may detect an emergency engine shutoff, an over-voltage condition, or an under-voltage condition within the system 100, in response to which the control interface unit 101 may be configured to disengage the automatic control system 107 and transmit a message indicating that an internal fault or an emergency engine shutoff was detected.

Figure 5:
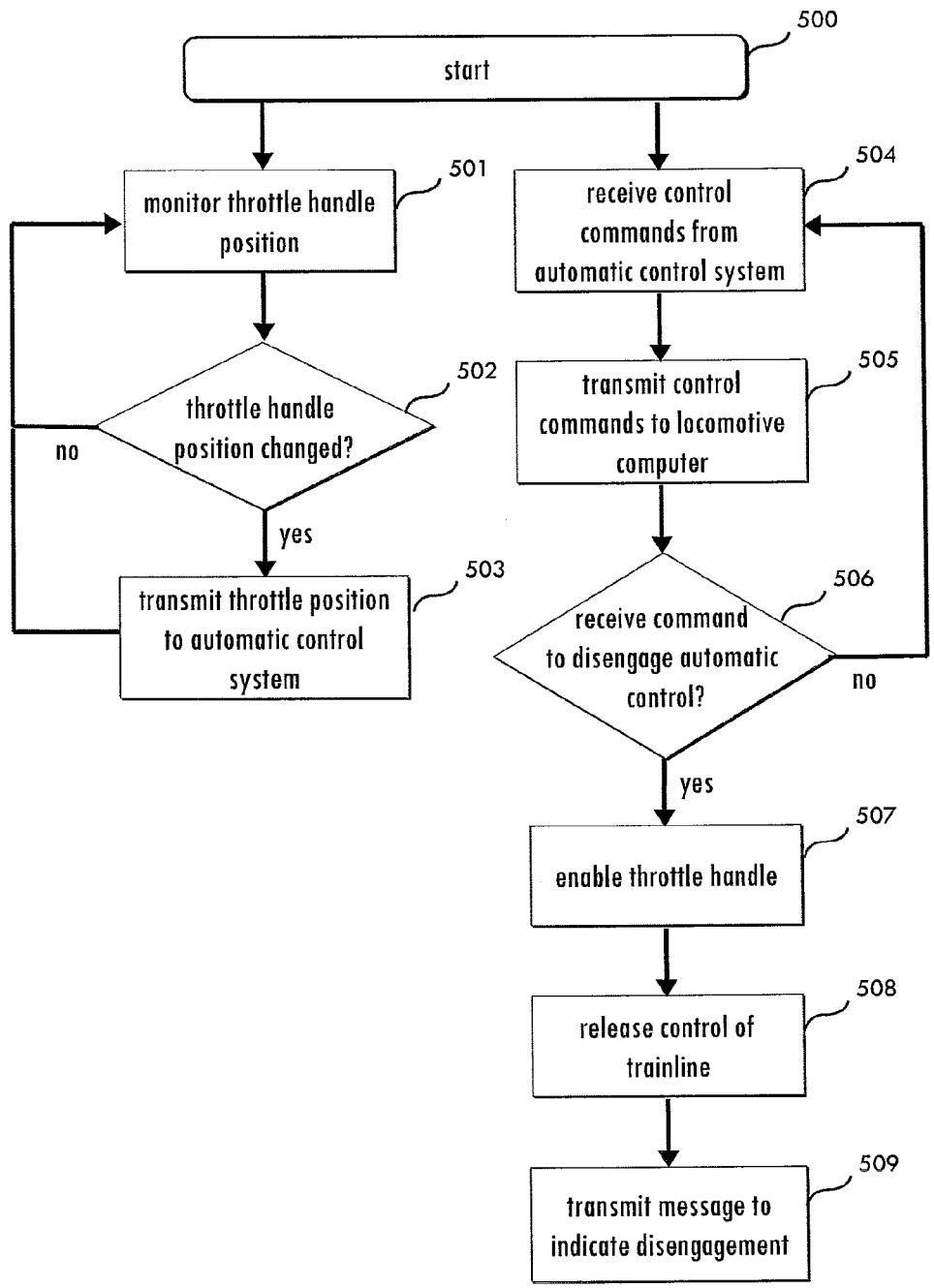
FIG. 5 is a step diagram for another embodiment of a manual control interface system and method according to the principles of the present invention.

With reference to FIG. 5, a method for automatically controlling a locomotive 103 and disengaging an automatic control system 107 is shown according to one preferred and non-limiting embodiment. In FIG. 5, the automatic control system 107 is engaged at a starting step 500. During automatic control, the manual control interface system 100 monitors the throttle handle 106 position at step 501 and, at step 502, determines if the throttle handle 106 position has changed. If the position has not changed, the method proceeds back to monitoring the throttle handle 106 position at step 501. If the position has changed, the system transmits the throttle handle 106 position to the automatic control system 107 at step 503 and proceeds back to monitoring the throttle handle 106 position at step 501.

With continued reference to FIG. 5, while the automatic control system 107 is engaged at the starting point 500, the manual control interface system 100 receives control commands from the automatic control system 107 at step 504. At step 505, the manual control interface system 100 transmits the control commands to the locomotive control system 105 after converting the commands to analog or otherwise processing the commands. At step 506, the system 100 determines if a command has been received to disengage the automatic control system 107. If a disengagement command is received, the method proceeds to step 507 and communication between the throttle handle 106 and locomotive control system 105 is enabled. Once the throttle handle 106 is enabled, the manual control interface system 100 releases control of the trainline 104 and/or locomotive control system 105 at step 508 and, at step 509, transmits a message to indicate that the automatic control system 107 has been disengaged. If, at step 506, a disengagement command is not received, the method proceeds back to step 504 and continues receiving commands from the automatic control system.

In one preferred and non-limiting embodiment, the manual control interface system 100 may be configured to receive software updates from a mobile device management server of a back office server (BOS) with a client proxy executed by the train management computer 109. Updates to the manual control interface system 100 may be provided through a Systems Management Server (SMS), for example. The client proxy executed by the train management computer 109 may retrieve the software updates and install them on the control interface unit 101.

In one preferred and non-limiting embodiment, the manual control interface system 100 may be configured to operate from a 74 volt DC or 110 volt AC locomotive battery power source 122 and may consume no more than 15 watts to power its internal circuitry. The system 100 may be isolated from the chassis of the locomotive by 2,000 volt DC or 1,000 volt AC transformers, with a leakage current as high as 1 milliampere. However, it will be appreciated that any number of arrangements for power and electrical isolation may be employed.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A manual control interface for automatically controlling a locomotive, comprising:
 a control interface unit configured to receive input from at least one manual control, receive input from an automatic control system, and transmit commands to a locomotive control system, wherein the commands are based at least partially on the input received from the automatic control system, and wherein the input received from the automatic control system comprises at least one control command for controlling at least one locomotive function of the locomotive control system; and
 a bypass relay configured to enable or disable communication between the at least one manual control and the locomotive control system,
 wherein the at least one manual control comprises at least one of a throttle handle and a brake handle, wherein the control interface unit is configured to determine at least one of the following: i) if a position of the throttle handle matches a current throttle setting of the automatic control system when the communication between the at least one manual control and the locomotive control system is disabled, ii) if a setting of the brake handle matches a current brake setting of the automatic control system when the communication between the at least one manual control and the locomotive control system is disabled, or any combination thereof; and
 wherein the control interface unit is connected to the bypass relay, and wherein the control interface unit controls the bypass relay to prevent enablement of the communication between the at least one manual control and the locomotive control system in response to at least one of the following: a) a determination that the position of the throttle handle does not match the current throttle setting of the automatic control system, b) a determination that the setting of the brake handle does not match the current brake setting of the automatic control system, or any combination thereof.

2. The manual control interface of claim 1, wherein the at least one manual control further comprises at least one of a dynamic brake manual control and an air brake manual control, and wherein the control interface unit is configured to receive input from at least one of the following: the throttle handle, the dynamic brake manual control, the air brake manual control, a distributed power system, a positive train control system, or any combination thereof.

3. The manual control interface of claim 1, wherein the automatic control system comprises an energy management system.

4. The manual control interface of claim 1, wherein the bypass relay disables communication between the at least one manual control and the locomotive control system when the automatic control system is engaged.

5. The manual control interface system of claim 1, wherein the at least one manual control comprises the throttle handle, and wherein the control interface unit transmits data indicating a position of the throttle handle to the automatic control system when the communication between the at least one manual control and the locomotive control system is disabled.

6. The manual control interface system of claim 1, wherein the bypass relay enables communication between the at least one manual control and the locomotive control system when at least one of the following occurs: the automatic control system is disengaged, the automatic control system is powered off, a fault occurs, or any combination thereof.

7. The manual control interface of claim 1, wherein the manual control interface system is configurable to locomotives independent of manufacturer and/or model.

8. The manual control interface of claim 1, further comprising a locomotive system integration router configured to communicate with the control interface unit and at least one of the following: a distributed power system, an air brake system, or any combination thereof.

9. A method for automatically controlling a locomotive, comprising:
 receiving, by a processor of a manual control interface system, automatic control data from an automatic control system;
 controlling, by the processor, a bypass relay connected to the processor to disable communication between at least one manual control and a locomotive control system;
 detecting, by the processor, a state of the at least one manual control;
 transmitting, by the processor, the state of the at least one manual control to the automatic control system; and
 transmitting, by the processor, to the locomotive control system, control data based at least partially on the automatic control data, wherein the automatic control data comprises at least one control command for controlling at least one locomotive function of the locomotive control system, wherein the at least one manual control comprises at least one of a throttle handle and a brake handle, the method further comprising:
 determining at least one of the following: i) if a position of the throttle handle matches a current throttle setting of the automatic control system when the communication between the at least one manual control and the locomotive control system is disabled, ii) if a setting of the brake handle matches a current brake setting of the automatic control system when the communication between the at least one manual control and the locomotive control system is disabled, or any combination thereof; and controlling, by the processor, the bypass relay to prevent enablement of the communication between the at least one manual control and the locomotive control system in response to at least one of the following: a) a determination that the position of the throttle handle does not match the current throttle setting of the automatic control system, b) a determination that the setting of the brake handle does not match the current brake setting of the automatic control system, or any combination thereof.

10. The method of claim 9, further comprising:
receiving, by the processor, a request to disengage the automatic control system; and
enabling, by the processor, the connection between the at least one manual control and the locomotive control system.

11. The method of claim 10, further comprising:
releasing, by the processor, control of the locomotive control system; and
transmitting, by the processor, a message indicating that the automatic control system has been disengaged.

12. The method of claim 9, wherein the at least one manual control comprises a throttle handle, the method further comprising:
receiving, by the processor, a command to engage the automatic control system; and
engaging, by the processor, the automatic control system only if the throttle handle is in a specified position.

13. The method of claim 9, wherein transmitting the control data comprises transmitting signals to a train line of the locomotive, such that the signals are substantially similar to manual control signals.

14. The method of claim 9, wherein the automatic control system comprises an energy management system.

15. The method of claim 9, wherein the automatic control system is configured to transition to automatic control based at least partially on the state of the at least one manual control.

16. A control interface unit for automatically controlling a locomotive, the control interface unit adapted to communicate with a throttle handle, a cruise control system, and a locomotive computer, the control interface unit comprising at least one processor, wherein the control interface unit is configured to:
control a bypass relay connected to the control interface unit to disable communication between the throttle handle and the locomotive computer;
receive cruise control commands from the cruise control system; and
control the locomotive based at least partially on the cruise control commands,
wherein the control interface unit is further configured to detect a position of the throttle handle when the communication between the throttle handle and the locomotive computer is disabled, wherein the control interface unit is configured to determine if the position of the throttle handle matches a current throttle setting of the cruise control system when the communication between the throttle handle and the locomotive computer is disabled, and wherein the control interface unit controls the bypass relay to prevent enablement of the communication between the throttle handle and the locomotive control system in response to a determination that the position of the throttle handle does not match the current throttle setting of the cruise control system.

17. The control interface unit of claim 16, wherein the processor is further configured to:
receive a command to disengage the cruise control system; and enable the throttle handle.

18. The control interface unit of claim 17, wherein the control interface unit is further configured to:
release control of the locomotive computer; and
transmit a message indicating that the cruise control system has been disengaged.

19. The control interface unit of claim 16, wherein the control interface unit is further configured to: receive a command to engage the cruise control system; and engage the cruise control system only if the throttle handle is in a specified position.

20. The control interface unit of claim 16, wherein controlling the locomotive computer comprises transmitting signals to a trainline of the locomotive such that the signals are substantially similar to manual control signals.

21. The control interface unit of claim 16, wherein the control interface unit is further adapted to communicate with at least one of the following: an air brake controller, a distributed power system, a positive train control system, an energy management system, or any combination thereof.

22. The control interface unit of claim 16, wherein at least a portion of the cruise control commands received are digital signals, the control interface unit further configured to convert the digital signals to analog signals, and wherein the locomotive is controlled based at least partially on at least a portion of the analog signals.

23. The control interface unit of claim 16, wherein the control interface unit is further configured to transmit a position of the throttle handle to the cruise control system.

24. The control interface unit of claim 23, wherein the cruise control system uses the position of the throttle handle to disengage cruise control.

25. The control interface unit of claim 16, further comprising at least one analog circuit configured to communicate with the throttle handle and a trainline of the locomotive.

26. The control interface unit of claim 16, further comprising an Ethernet interface configured to communicate with the cruise control system and the at least one processor, the cruise control system comprising a train management computer, an energy management application, or any combination thereof.

27. The manual control interface of claim 1, wherein the control command is configured to control at least one of acceleration and braking of the locomotive.

* * * * *